United States Patent [19]

Myers et al.

[11] Patent Number: 5,523,883

[45] Date of Patent: Jun. 4, 1996

[54] FIELD ADJUSTABLE BEAM SPLITTER

[75] Inventors: David S. Myers; Gerald R. Rickel, both of Hilton Head, S.C.

[73] Assignee: Kigre, Inc., Hilton Head, S.C.

[21] Appl. No.: 215,904

[22] Filed: Mar. 22, 1994

[51] Int. Cl.$^6$ .................................................. G02B 27/14
[52] U.S. Cl. ........................... 359/629; 33/248; 359/634; 359/872
[58] Field of Search ............................ 33/248, 241, 242; 359/618, 629, 634, 819, 822, 872

[56] References Cited

U.S. PATENT DOCUMENTS 4,881,814  11/1989  Hoult ...................................... 359/629

Primary Examiner—David C. Nelms
Assistant Examiner—F. Niranjan
Attorney, Agent, or Firm—Howard & Howard

[57] ABSTRACT

A field adjustable beam splitter includes a mirror pivotably supported at a pivot point, a first wedge which is movable and which supports the mirror at a first support point, and a second wedge which is also movable and which supports a mirror at a second support point. The support points and pivot points are preferably arranged in a right triangular relationship with the pivot point being at the right angled apex thereof. Motion of the wedges along parallel paths of travel causes the mirror to tilt on its pivot axis in mutually perpendicular directions.

15 Claims, 3 Drawing Sheets

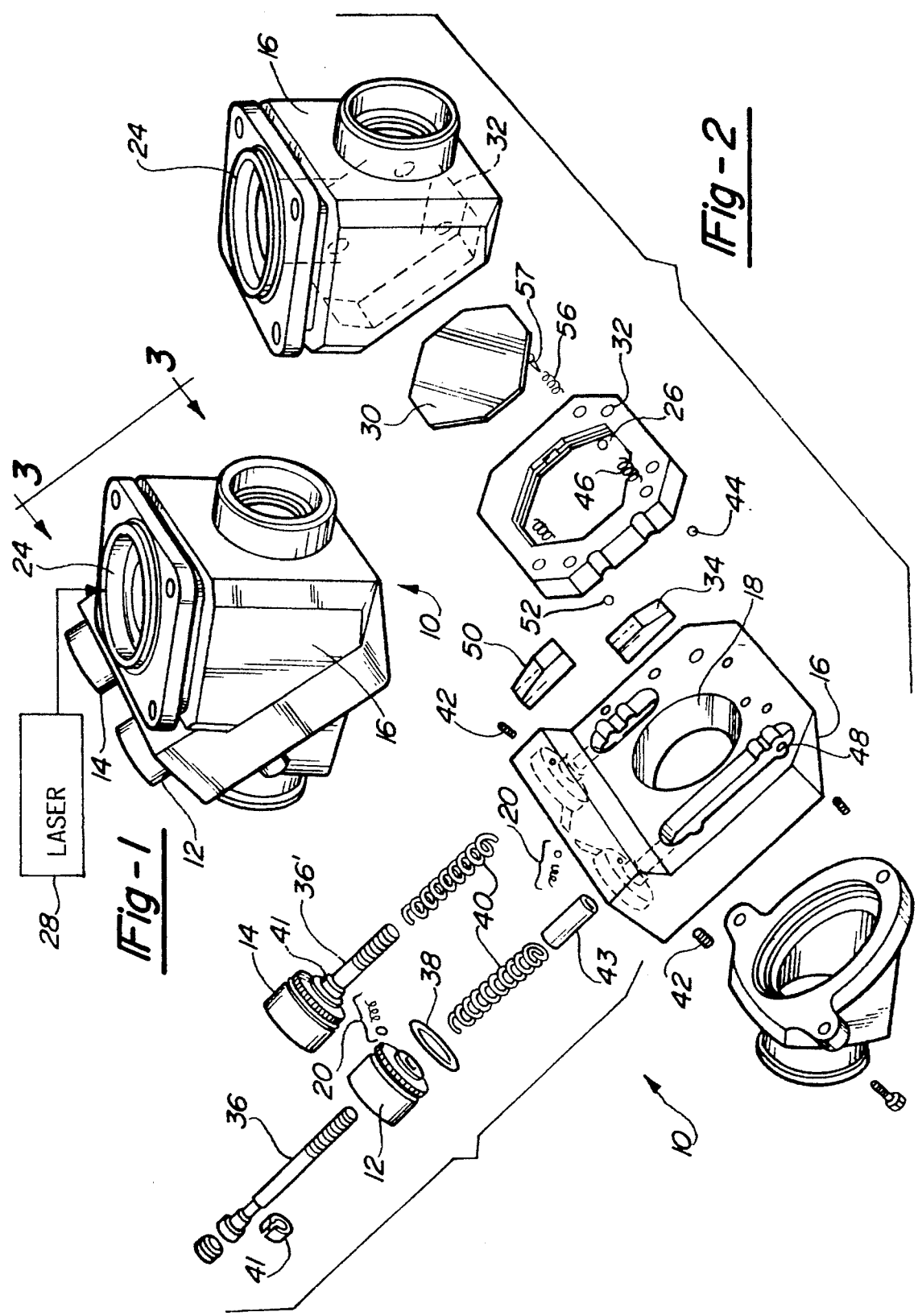

FIELD ADJUSTABLE BEAM SPLITTER

FIELD OF THE INVENTION

This invention relates generally to optical devices. More specifically, the invention relates to beam splitters of the type which include a partially reflective mirror therein and which are typically employed in combination with dual channel optical systems, such as night vision devices. Most specifically, the invention relates to a beam splitter in which two axis adjustment of the position of a mirror is achieved.

BACKGROUND OF THE INVENTION

Night vision systems operate to greatly enhance low levels of ambient, or externally provided illumination and permit a user to make observations and carry on activities under conditions of near total darkness. In some instances, the devices are sensitive to wave lengths of light outside the normal human visual range. One particular utility for night vision equipment is as a sighting device for firearms and such equipment is sold by Kigre, Inc. of Hilton Head, S.C. a under the designation KN-200 and KN-250.

A beam splitter is an important component of many night vision devices. The beam splitter includes a mirror which directs a first portion of an incident light beam to a first channel of an optical system and a second portion to a second channel. In some instances, the mirror is a dichoric mirror which reflects a first group of wavelengths, typically infrared wave lengths, and transmits a second, typically visible, group of wavelengths. In other instances, the beam splitter includes a partially silvered mirror. It will be appreciated that alignment of the elements of any optical system is critical; and this is particularly so when the optical system is used as part of a firearm sighting device. Heretofore, beam splitters of the type employed in combination with night vision devices comprised sealed optical units which included a mirror supported by three adjustment screws. If the beam splitter needed alignment, it had to be returned to a factory service facility for disassembly. Furthermore, the use of three mounting screws for positioning the mirror made alignment difficult.

Beam splitters associated with night vision equipment are typically employed under harsh conditions, and cannot always be readily returned to the factory for realignment. Accordingly, there is a need for a beam splitter, particularly one of the type utilized in conjunction with night vision equipment, which may be easily adjusted in the field without disassembly. Furthermore, this device should be rugged and environmentally sealed.

The present invention provides a field adjustable beam splitter in which the position of the mirror may be simply and accurately adjusted along two mutually perpendicular axes so as to provide true windage and elevation adjustment capabilities. This feature makes the device very compatible with firearm sighting systems. The beam splitter of the present invention is accurate and rugged and permits rapid boresighting of firearms in the field. These and other advantages of the present invention will be readily apparent from the drawings, discussion anti description which follow.

BRIEF DESCRIPTION OF THE INVENTION

There is disclosed herein a field adjustable beam splitter for positionably supporting a mirror relative to an optical device. The beam splitter includes a mirror which is engaged, and pivotably supported by, a pivot member so that the mirror may be pivoted about a pivot point. The beam splitter includes a first adjustment assembly which comprises a first support member disposed at a first support point relative to the mirror, and a first wedge in mechanical communication with the first support member and the mirror. The wedge has a first taper axis and the system includes an adjustment member operable to move the wedge along its taper axis relative to the first support member so that the mirror is pivoted in a first direction about the pivot point when the wedge is moved. The beam splitter also includes a second adjustment assembly which includes a second support member disposed at a second support position relative to the mirror. The second adjustment assembly also includes a second wedge in mechanical communication with the second support member and mirror. The second wedge has a second taper axis. The second adjustment assembly further includes a second adjustment member operable to move the second wedge along the second taper axis relative to the second support member so that the mirror may be pivoted in a second direction about the pivot point when the second wedge is moved.

In particular embodiments, the beam splitter is configured so that the taper axis of the first wedge and the taper axis of the second wedge are generally parallel to one another. In some instances, the first support point, second support point and pivot point form a right triangle with the pivot point at the right angle vertex thereof. The first and second support members may each comprise a ball associated with the mirror and a face of each of said wedges engages a respective one of said balls. The pivot member may also include a spherical surface which engages the mirror, and the mirror, which may be a dichoric mirror, may be biased into contact with the wedges by one or more springs. It is generally preferable that the beam splitter be enclosed in a moisture-proof housing.

BRIEF DESCRIPTION OF THE DRAWINGS

FIG. 1 is a perspective view of one embodiment of beam splitter structured in accord with the present invention;

FIG. 2 is an exploded, perspective view of the beam splitter of FIG. 1;

DETAILED DESCRIPTION OF THE INVENTION

Figure 3:
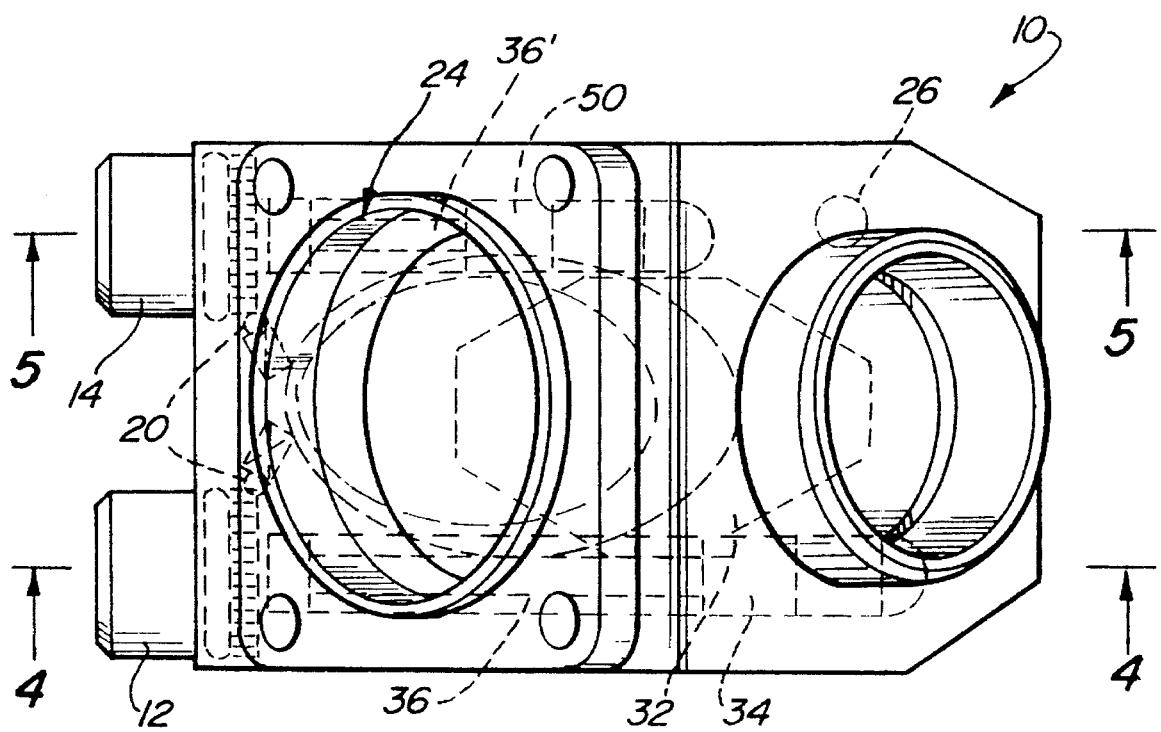
FIG. 3 is a plan view of the beam splitter of FIG. 1, sighting along line 3—3 thereof in a direction generally perpendicular to the mirror thereof.

The beam splitter of the present invention may be readily adjusted without removal from associated equipment. When used with a night vision sighting device, the beam splitter of the present invention may be adjusted for windage and elevation by the use of two knobs conveniently disposed on the beam splitter proximate the front lens of the night vision device, when it is affixed thereto. Referring now to FIG. 1, there is shown a perspective view of one embodiment of beam splitter structured in accord with the principles of the present invention. FIG. 2 shows an exploded view of the same beam splitter 10. The beam splitter 10 includes a housing 16 which is preferably moistureproof and further includes a collar 24 configured to attach the beam splitter 10 to a night vision device 28 such as the KN 200 or KN 250 described hereinabove. It is to be understood that the beam splitter may be used in other applications, and as such, the housing 16 may be differently configured.

The beam splitter 10 includes adjustment knobs 12, 14 which, as will be explained in greater detail herein below, operate to adjust the mirror thereof for windage and elevation. In one preferred embodiment, the knobs each have associated therewith a detent mechanism, such as the ball and spring detent mechanism 20 shown herein. In the illustrated detent mechanism 20, the ball engages a series of notches along the periphery of each of the adjustment knobs. In this manner, click-stop action is achieved, and movement of the knobs 12, 14, and hence movement of the mirror, may be accurately quantified.

Knobs 12, 14 each have an adjustment screw 36, 36' associated therewith. The screws each engage a respective adjustment wedge 34, 50 and are biased there against by a spring 40. As will be described in greater detail hereinbelow, rotation of the screws 36, 36' causes the wedge 34, 50 to travel along the respective screw. The beam splitter further includes a mirror 30 mounted to a mirror support 32. The wedges 34 and 50 engage the mirror support 32 by means of support balls 44 and 52. The mirror support 32 is further supported by a pivot ball 26, and as will be explained in greater detail hereinbelow, the interaction of the foregoing parts provides for pivoting of the mirror.

Referring now to FIG. 3, there is shown a plan and view of the beam splitter 10 of FIG. 1, taken along line 3—3 and looking in a general direction perpendicular to the mirror. Illustrated in FIG. 3, in phantom outline, are the wedges 34 and 50, the pivot ball 26, detents 20 and adjustment screws 36, 36'.

Figure 4:
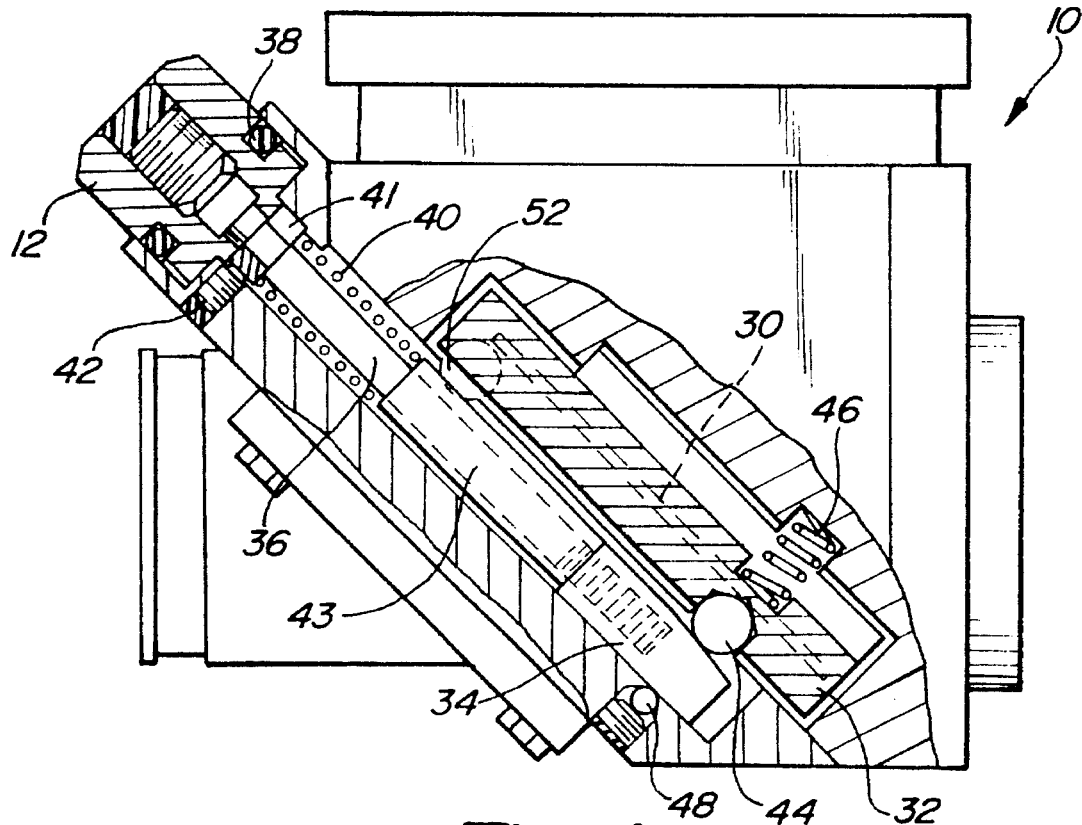
FIG. 4 is a cross sectional view of the device of FIG. 3 taken along line 4—4.

Referring now to FIG. 4, there is shown a cross-sectional view of the beam splitter 10 of FIG. 3 taken along line 4—4. In the illustrated embodiment, a beam splitting element 30, which may be a dichoric mirror, a half silvered mirror, a holographic optical element or the like is supported in a mount 32, and within the context of the present disclosure, the beam splitting element 30 as well as its associated mount 32 will be collectively referred to as a mirror. The beam splitter 10 includes a first adjustment wedge 34 and this wedge is mechanically coupled to a screw 36 which is rotated by the adjustment knob 12. It will be noted that the adjustment knob 12 includes an O-ring seal 38 which engages the housing 16 and prevents entry of moisture. The screw 36 is biased into tight engagement with the wedge 34 by a loading spring 40 which bears against a spacer 43 and the spring 40 and screw 36 are captured by a collar 41, retained by a set screw 42.

Rotation of the adjustment knob 12 turns the screw 36 which in turn causes the wedge 34 to move along its taper axis. Within the context of the present disclosure, "taper axis" shall refer to an axis passing through the wedge in a direction corresponding to the thickness variation thereof so that at one end of the taper axis the wedge has a maximum thickness, whereas at the other end thereof it has a minimum thickness.

The mirror mount 32 includes a support ball 44 retained therein and this ball 44 is in contact with a front face of the wedge 34. In the illustrated embodiment, the beam splitter further includes a spring 46 which urges the mirror mount 32, and the support ball 44 toward the wedge 34, and a back face of the wedge 34 is supported by a fixed contact ball 48.

As the knob 12 is turned, it causes the screw 36 to also turn, and to thereby move the wedge 34 along its axis of taper. The motion of the wedge in turn moves the support ball 44 in a direction generally perpendicular to the axis of taper of the wedge 34. As will be explained in greater detail below, the mirror is supported at a pivot point, and this motion of the support ball 44 causes the holder 32 and mirror 30 pivot about the pivot point to provide one axis of adjustment.

Figure 5:
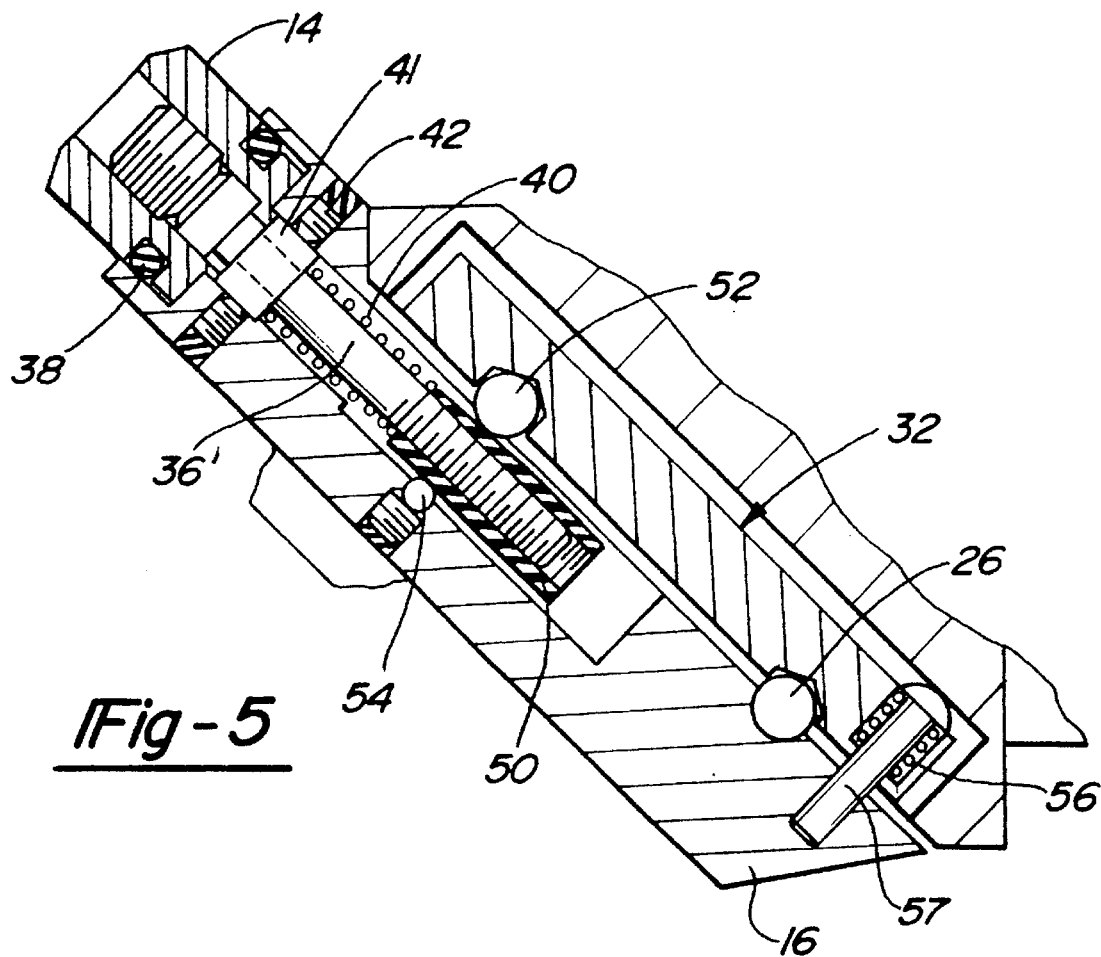
FIG. 5 is a cross sectional view of the device of FIG. 3 taken along line 5—5.

Referring now to FIG. 5 there is shown another cross-sectional view of the device of FIG. 3 taken along line 5—5. FIG. 5 illustrates a second wedge 50 engaged by a screw 36' which in turn is rotatable against a loading spring 40 by means of an adjustment knob 14. As in the previous view, the adjustment knob 14 is sealed by an O-ring 20 and the spring 40 and screw 36' are retained by a collar 41 and set screw 42 arrangement. The mirror mount 32 includes a second support ball 52 which engages the wedge 50. The second wedge 50 is also supported by a fixed contact ball 54.

Also visible in the FIG. 5 view is a pivot ball 26 which engages the mirror mount 32 and housing 16 of the beam splitter. The mirror mount 32 is biased against the pivot ball 26 by a spring 56 retained by a screw 57. This arrangement supports the mirror in a manner which permits it to pivot about a pivot axis defined through the pivot ball 26.

When the wedge 50 is moved along its taper axis by the screw 36, it will cause the support ball 52, mirror mount 32 and mirror 30 to move in a direction, which is generally perpendicular to the axis of taper of the second wedge 50. Since the mirror is pivotably retained at the pivot point established by the pivot ball 26, and is also supported by the first support ball 44, shown in FIGS. 2 and 4, this motion will cause the mirror to tilt, thereby permitting adjustment in one plane.

Figure 6:
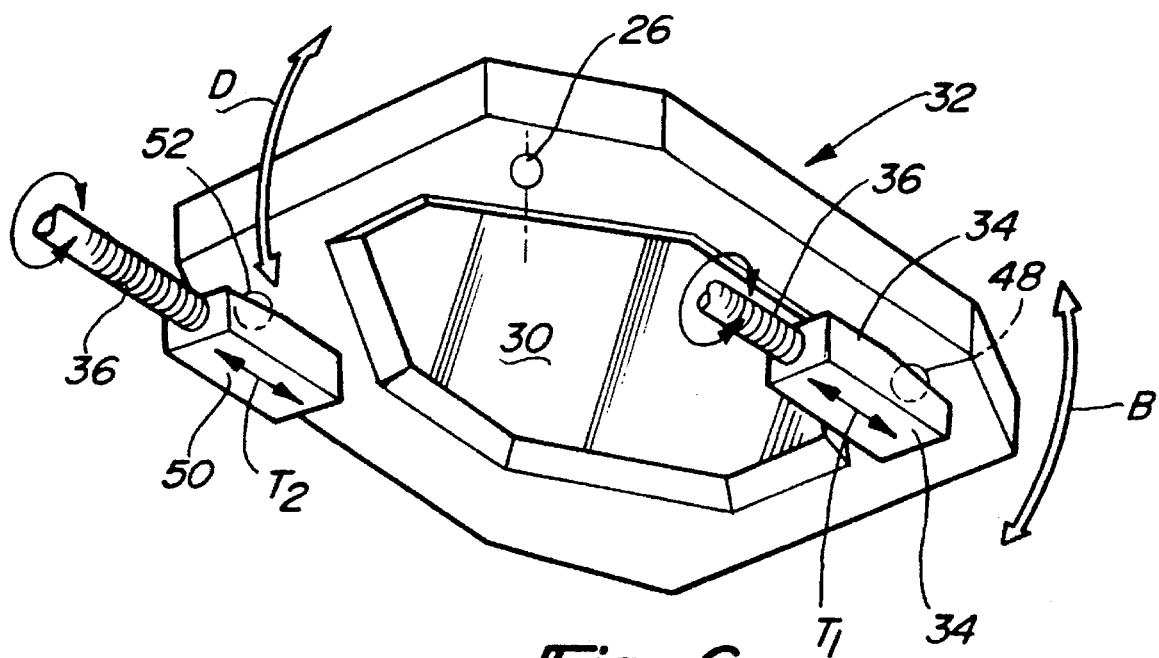
FIG. 6 is a schematic depiction illustrating the manner in which a pair of wedges cooperate to adjust the position of a mirror in accord with the present invention.

Referring now to FIG. 6, there is shown a simplified schematic depiction of the mirror positioning mechanism of the present invention. As shown a mirror mount 32, which carries a mirror 30, is supported at a first support point by ball 48 or similar member which engages a wedge 34. A second wedge 50 engages the mount 32 through a second ball 52. The mirror is also supported at a pivot point by a third ball 26. When the first wedge 34 is moved along its axis of taper, as indicated by arrow $T_1$, it raises and lowers the corresponding corner of the mirror. Since the mirror is pivotably supported at the pivot point by the ball 26, and is also supported by contact of the ball 52 with the second wedge 50, this motion causes the mirror to pivot about the pivot axis 60 in a first direction as shown by arrow B. Corresponding motion of the second wedge 50, as shown by arrow $T_2$ causes pivoting as shown by arrow D.

It will be appreciated that the mirror is always supported at three points to insure rigidity thereof. One of the points is a fixed pivot point, and the other two points are height adjustable. In general, it is preferred that the points be arranged to define a right triangle with the pivot point being at the right angled vertex of the triangle. In this manner, the two axes of adjustment are mutually perpendicular, and accurate windage and elevation adjustments may be made.

As illustrated in the figures, the wedge, for example wedge 50 in FIG. 5, engages the mirror through a support ball 52 which contacts its front face, and as further illustrated, a contact ball 54 engages the rear face of the wedge 50. It has been found that the contact ball 54 may be made to be factory adjustable with regard to height, and can be used for making relatively coarse adjustments to the mirror mount 32 of the beam splitter during manufacture. In general, this adjustment need not be user accessible, and adjustment of the wedge will suffice to properly position the mirror 30 in the normal use of the beam splitter.

It will be appreciated that various other mechanical arrangements for engaging the mirror and wedge may be employed in the practice of the present invention. For example, the fixed contact balls 52, 48 may be dispensed with, and the wedges 36, 50 allowed to move along an appropriately prepared surface of the housing 16. In other embodiments, the support balls 44, 52 may be replaced by another type of bearing surface such as a post, a knife edge or the like. In some instances, the back surface of the mirror mount itself may be appropriately prepared to allow the wedge to slide there along. In general, a relatively small degree of motion will suffice to provide for a wide range of mirror adjustability.

In one particular embodiment, a beam splitter includes an adjustment knob with 24 detent notches therein. The pitch of the screw is selected such that each of the 24 clicks indexed by the detent mechanism causes the wedge to move 0.0013 inches. The taper of the wedge, is selected such that this motion causes the mirror to move through ¼ second of arc, which in terms of a sighting device translates to a shift of ¼ inch in aim point at 100 yards. It will be appreciated that by appropriately selecting screw pitch, wedge geometry and the distance between the pivot point and support points, other values may be similarly selected for.

It is also to be understood within the context of the present disclosure, the motion of the wedge is described as moving the mirror and its supporting ball in a direction generally perpendicular to the axis of taper. However, since the mirror pivots about the pivot axis, the motion is slightly arcuate with respect to the pivot axis; however, any such degree of curvedness relatively small, and within the context of the present disclosure such motion will be regarded as being substantially perpendicular to the taper axis.

The present invention provides a simple mechanical assembly for positionably adjusting a mirror or other such optical element in two mutually perpendicular directions, even though the path of travel of the adjusting elements is parallel. This feature provides for simplicity of design and allows placement of both windage and elevation adjustments on the same surface of the device, thereby facilitating adjustment and easing design constraints. While the beam splitter of the present invention has primarily been described with reference to its use in a night vision device, the principles hereof may be applied to a variety of optical systems wherein a rugged, reliable system for accurately positioning an optical element in two directions is desired. As noted above, a number of variations of the wedge and mirror support members may be implemented in accord with the present invention. In view of the foregoing, it will be appreciated that the drawings, discussion and description herein are merely meant to illustrate particular embodiments of the invention, and are not meant to be limitations upon the practice thereof. It is the following claims, including all equivalents, which define the scope of the invention.

We claim:

1. A field-adjustable beam splitter for positionably supporting a mirror relative to an optical device comprising:

I. a mirror;

II. a pivot member which engages and supports said mirror at a pivot point so that said mirror may be pivoted about said pivot point;

III. a first adjustment assembly comprising:

(a) a first support member disposed at a first support point relative to said mirror;

(b) a first wedge disposed in mechanical communication with said first support member and said mirror, said wedge having a first taper axis;

(c) a first adjustment member operable to move said first wedge along the first taper axis relative to the first support member, whereby the mirror is pivoted in a first direction about said pivot axis when said first wedge is moved;

IV. a second adjustment assembly comprising:

(a) a second support member disposed at a second support point relative to said mirror;

(b) a second wedge in mechanical communication with said second support member and said mirror, said wedge having a second taper axis parallel to said first taper axis;

(c) a second adjustment member operable to move said second wedge along the second taper axis relative to the second support member, whereby said mirror is pivoted in a second direction about said pivot axis when said second wedge is moved.

2. A beam splitter as in claim 1, wherein said first support point, second support point and pivot point define a right triangle with the pivot point at the right angled vertex thereof.

3. A beam splitter as in claim 1, wherein said first adjustment member and said second adjustment member each include a screw which is operable to move a respective one of said wedges along its taper axis when rotated.

4. A beam splitter as in claim 3, wherein each of said screws has a detent mechanism associated therewith for controlling rotation of said screw.

5. A beam splitter as in claim 1, wherein said first and said second support member each include a support ball associated with the mirror and wherein the respective wedge of each adjustment assembly includes a front face which engages said ball.

6. A beam splitter as in claim 5, wherein said first adjustment assembly and said second adjustment assembly each include a contact ball separate from the mirror disposed to engage a back face of a respective one of said first and second wedges when the front face thereof engages the support ball.

7. A beam, splitter as in claim 1, wherein said mirror is a dichoric mirror.

8. A beam splitter as in claim 1, wherein said pivot member includes a spherical surface which engages and supports the mirror.

9. A field-adjustable beam splitter for positionally supporting a dichoric mirror relative to a dual-channel optical device comprising:

I. a dichoric mirror;

II. a pivot ball disposed so as to engage and pivotably support the mirror;

III. a first adjustment assembly comprising:

(a) a first support ball associated with said mirror at a first support point;

(b) a first wedge having a first taper axis; said first wedge having a front face in contact with the first support ball; and (c) a first adjustment screw in mechanical engagement with said first wedge, said first screw being operable, when rotated, to move the first wedge along said first taper access so that said first wedge moves said first support ball in a direction generally perpendicular to said first taper axis and thereby pivots the mirror in a first direction about said pivot axis; and IV. a second adjustment assembly comprising:
  (a) a second support ball associated with said mirror at a second support point;
  (b) a second wedge having a second taper access, said second wedge having a second face in contact with said second support ball; and
  (c) a second adjustment screw in mechanical engagement with said second wedge, said second screw being operable, when rotated, to move the second wedge along the second taper access so that said second wedge moves a second support ball in a direction generally perpendicular to said second taper axis and thereby pivots the mirror in a second direction about said pivot axis;

V. said beam splitter being configured so that said first and second taper axes are generally parallel and the first and second support balls and the pivot ball form an approximate right triangle with the pivot ball at the right angled vertex thereof.

10. A beam splitter as in claim 9, further including at least one spring disposed so as to bias the mirror, and the first and second support balls associated therewith, into contact with the first and second wedges respectively.

11. A beam splitter as in claim 9, further including a moisture-proof housing which encloses the mirror, the first and second wedges and the first and second adjustment screws.

12. A field-adjustable beam splitter for positionably supporting a mirror relative to an optical device comprising:
  I. a mirror;
  II. a pivot member which engages and supports said mirror at a pivot point so that said minor may be pivoted about said pivot point;
  III. a first adjustment assembly comprising:
    (a) a first support member disposed at a first support point relative to said mirror;
    (b) a first wedge disposed in mechanical communication with said first support member and said mirror, said wedge having a first taper axis;
    (c) a first adjustment member operable to move said first wedge along the first taper axis relative to the first support member, whereby the mirror is pivoted in a first direction about said pivot axis when said first wedge is moved;
  IV. a second adjustment assembly comprising:
    (a) a second support member disposed at a second support point relative to said mirror;
    (b) a second wedge in mechanical communication with said second support member and said mirror, said wedge having a second taper axis;
    (c) a second adjustment member operable to move said second wedge along the second taper axis relative to the second support member, whereby said mirror is pivoted in a second direction about said pivot axis when said second wedge is moved; and
  said mirror spring biased into mechanical communication with said first and second wedges, whereby said mirror may be adjusted in two directions about said pivot member.

13. A beam splitter as defined in claim 12, wherein said first wedge and second wedge are disposed so that the taper axes thereof are parallel.

14. A beam splitter as defined in claim 13, wherein said first support point, said second support point and said pivot point define a right triangle with the pivot point at the right angled vertex thereof.

15. A beam splitter as defined in claim 12, wherein said pivot member includes a spherical surface which engages and supports said mirror.

* * * * *